(12) United States Patent
Zheng et al.

(10) Patent No.: US 12,299,442 B2
(45) Date of Patent: May 13, 2025

(54) CONFIGURATION TOOL FOR DEPLOYING SOFTWARE APPLICATION TO A CLOUD COMPUTING ENVIRONMENT

(71) Applicant: State Farm Mutual Automobile Insurance Company, Bloomington, IL (US)

(72) Inventors: Song Zheng, Duluth, GA (US); Michelle DeLynn Adler, Sugar Hill, GA (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 143 days.

(21) Appl. No.: 18/341,629

(22) Filed: Jun. 26, 2023

(65) Prior Publication Data

US 2024/0427595 A1    Dec. 26, 2024

(51) Int. Cl.

| | | |
|---|---|---|
| G06F 9/445 | (2018.01) | |
| G06F 8/41 | (2018.01) | |
| G06F 8/60 | (2018.01) | |
| G06F 8/61 | (2018.01) | |
| G06F 8/71 | (2018.01) | |
| G06F 8/77 | (2018.01) | |
| G06F 9/455 | (2018.01) | |
| G06F 11/36 | (2006.01) | |

(52) U.S. Cl.
CPC ............. *G06F 8/77* (2013.01); *G06F 8/60* (2013.01); *G06F 8/71* (2013.01)

(58) Field of Classification Search
CPC ...... G06F 8/77; G06F 8/60; G06F 8/71; G06F 9/45558; G06F 16/2358; G06F 16/21; G06F 16/27; G06F 9/45533; G06F 21/10; H04L 67/34
See application file for complete search history.

(56) References Cited

U.S. PATENT DOCUMENTS

| | | |
|---|---|---|
| 5,754,858 A | 5/1998 | Broman et al. |
| 8,417,798 B2 | 4/2013 | Chen et al. |
| 9,772,831 B2 | 9/2017 | Lucovsky et al. |
| 10,635,427 B2 | 4/2020 | Liu et al. |
| 10,990,368 B2 * | 4/2021 | Shodhan ............. G06F 8/60 |
| 12,184,490 B2 * | 12/2024 | Roberts, Jr. ......... H04M 3/5183 |
| 2008/0320441 A1 | 12/2008 | Ahadian et al. |

* cited by examiner

*Primary Examiner* — Thuy Dao
(74) *Attorney, Agent, or Firm* — Lee & Hayes, P.C.

(57) ABSTRACT

A configuration tool receives user input associated with a project to deploy a software application to a cloud computing environment. Based on the user input, the configuration tool generates an application package that includes application files, infrastructure configuration data, and customized deployment instructions. A user can follow the deployment instructions to use the application files and infrastructure configuration data within the cloud computing environment, such that the infrastructure configuration data automatically configures the cloud computing environment, and the cloud computing environment executes the software application based on the application files.

20 Claims, 5 Drawing Sheets

300

302 — Select Programming Language:
○ Java    ○ Golang    ○ Node.js    ○ Python

304 — Migrating Project?
○ Yes    ○ No

306 — Project Name:
[                                           ]

308 — Project Repository Information:
[                                           ]

310 — Team Name:            Team Email:
     [          ]           [          ]

Department:            Use Case:
     [          ]           [          ]

Off Hours Shutdown:    Workgroup:
     [          ]           [          ]

312 — Gateway Type:
○ Private    ○ Public

314 — Enable Secrets Manager?
○ Yes    ○ No

316 — Secret Key:           Secret Value:
     [          ]           [          ]

318 — [ Generate Application Package ]    [ Download Application Package ] — 320

FIG. 3

CONFIGURATION TOOL FOR DEPLOYING SOFTWARE APPLICATION TO A CLOUD COMPUTING ENVIRONMENT

TECHNICAL FIELD

The present disclosure relates to configuring a cloud computing environment to execute a software application, and more particularly to a configuration tool that generates an application package that can be used to automatically configure the cloud computing environment and deploy the software application in the cloud computing environment.

BACKGROUND

Software applications can execute in various computing environments. For example, a software application developed and/or used by an entity may execute in an on-premise computing environment that includes servers or other computing resources owned or operated by the entity. As another example, the software application associated with the entity may execute in a cloud computing environment that includes servers or other computing resources owned or operated by a separate cloud services provider. The computing resources of the cloud computing environment can include physical and/or virtual computing resources. For instance, the software application may execute via virtual machines, containers, and/or other virtual computing resources created within, and/or managed by, the cloud computing environment.

As an example, an entity may agree to rent or otherwise access computing resources of a cloud computing environment from a cloud services provider, such that one or more software applications developed and/or used by the entity can be executed via the cloud computing environment. By executing the software application in the cloud computing environment provided and maintained by a separate cloud services provider, the entity can focus on development and/or maintenance of the software applications, instead of also providing and maintaining computing resources of an on-premise computing environment that might otherwise execute the software application.

In some situations, the cloud computing environment can provide physical and/or virtual computing resources on an on-demand basis, such that the amount of computing resources in the cloud computing environment used by the entity in association with the software application may change dynamically over time. For instance, during a period of time in which the software application is in heavy use, additional computing resources of the cloud computing environment can be used to execute the software application and/or additional instances of the software application. During another period of time in which usage levels of the software application are lower, the amount of computing resources of the cloud computing environment used to execute the software application, and/or the number of instances of the software application executing in the cloud computing environment, can be decreased.

However, configuring a cloud computing environment to execute a software application can be a complex and time-intensive process. For example, there may be numerous steps involved in configurating a software application to execute in a cloud computing environment, such as steps to generate an image of the software application that can run in the cloud computing environment, steps to configure containers and/or other virtual computing resources in the cloud computing environment to execute the software application, steps to deploy the software application image to the cloud computing environment, and/or steps associated with other operations. Different steps of the deployment process can involve different platforms, computing resources, and/or other aspects associated with the cloud computing environment, such that one user may be unfamiliar with all of the different platforms, computing resources, and/or other aspects involved in deploying a software application to a cloud computing environment.

For example, a developer of a software application may have programming knowledge and experience associated with coding the software application itself. However, although that developer may be a skilled programmer, the developer may not be familiar with elements of a cloud computing environment, and the developer may need assistance from other developers who are more familiar with the cloud computing environment in order to get the software application up and running within the cloud computing environment. Such other developers may also each specialize on individual areas or platforms, such that a team of different developers with different skills may be tasked to help deploy a software application in the cloud computing environment.

Accordingly, different members of a cloud infrastructure team may perform different tasks associated with different aspects of the deployment process to get a software application up and running within the cloud computing environment. However, involving a team of multiple developers to deploy a single software application in a cloud computing environment can still be a labor-intensive and time-intensive process. For instance, it may take between four and six weeks for a team of three software engineers with different skills to configure a cloud computing environment to run a single software application.

The time, effort, and skill levels that may conventionally be needed to get a software application running in a cloud computing environment may, in many cases, prevent and/or delay developers from deploying and/or testing software applications in the cloud computing environment. For instance, a developer may want to test a new or experimental aspect of a software application in the cloud computing environment. However, the developer may be deterred from deploying the software application in the cloud computing environment for testing purposes, because it may take a few weeks before a separate cloud infrastructure team can deploy the software application in the cloud computing environment and the testing can be initiated.

The example systems and methods described herein may be directed toward mitigating or overcoming one or more of the deficiencies described above.

SUMMARY

Described herein are systems and methods associated with a configuration tool. The configuration tool can have a user interface by which the configuration tool receives user input associated with a project to deploy a software application to a cloud computing environment. The software application may be a new application, or an existing application that is being migrated to the cloud computing environment from another computing environment. The configuration tool can retrieve and/or modify data, based on the user input, to generate an application package includes application files, infrastructure configuration data, and customized deployment instructions. A user can follow the deployment instructions to use the application files and infrastructure configuration data within the cloud computing environment, such that the infrastructure configuration data automatically configures the cloud computing environment, and the cloud computing environment executes the software application based on the application files.

According to a first aspect, a computer-implemented method includes receiving, by one or more processors, and from a user device via a user interface of a configuration tool, user input associated with a project to deploy a software application to a cloud computing environment. The computer-implemented method also includes generating, by the one or more processors, application files associated with the project by modifying project data based on the user input. The computer-implemented method further includes generating, by the one or more processors, infrastructure configuration data associated with the project based on the user input. The infrastructure configuration data is configured to automatically configure one or more elements of the cloud computing environment in association with the software application. The computer-implemented method additionally includes generating, by the one or more processors, deployment instructions indicating how to use the application files and the infrastructure configuration data within the cloud computing environment. The computer-implemented method also includes providing, by the one or more processors, the application files, the infrastructure configuration data, and the deployment instructions to the user device.

According to a second aspect, a computing system includes one or more processors and memory. The memory stores computer-executable instructions associated with a configuration tool that, when executed by the one or more processors, cause the one or more processors to present, via a user device, a user interface of the configuration tool that requests user input associated with a project to deploy a software application to a cloud computing environment. The computer-executable instructions also cause the one or more processors to receive the user input via the user interface. The computer-executable instructions further cause the one or more processors to generate application files associated with the project by modifying project data based on the user input. The computer-executable instructions additionally cause the one or more processors to generate infrastructure configuration data associated with the project based on the user input. The infrastructure configuration data is configured to automatically configure one or more elements of the cloud computing environment in association with the software application. The computer-executable instructions also cause the one or more processors to generate deployment instructions indicating how to use the application files and the infrastructure configuration data within the cloud computing environment. The computer-executable instructions additionally cause the one or more processors to make the application files, the infrastructure configuration data, and the deployment instructions available for download to the user device.

According to a third aspect, one or more non-transitory computer-readable media store computer-executable instructions. The one or more non-transitory computer-readable media store computer-executable instructions associated with a configuration tool that, when executed by one or more processors of a computing system, cause the computing system to present, via a user device, a user interface of the configuration tool that requests user input associated with a project to deploy a software application to a cloud computing environment. The computer-executable instructions also cause the one or more processors to receive the user input via the user interface. The computer-executable instructions further cause the one or more processors to generate application files associated with the project by modifying project data based on the user input. The computer-executable instructions additionally cause the one or more processors to generate infrastructure configuration data associated with the project based on the user input. The infrastructure configuration data is configured to automatically configure one or more elements of the cloud computing environment in association with the software application. The computer-executable instructions also cause the one or more processors to generate deployment instructions indicating how to use the application files and the infrastructure configuration data within the cloud computing environment. The computer-executable instructions additionally cause the one or more processors to make the application files, the infrastructure configuration data, and the deployment instructions available for download to the user device.

According to a fourth aspect, a configuration tool includes means for receiving, via a user interface presented via a user device, user input associated with a project to deploy a software application to a cloud computing environment. The configuration tool also includes means for generating application files associated with the project by modifying project data based on the user input. The configuration tool further includes means for generating infrastructure configuration data associated with the project based on the user input. The infrastructure configuration data is configured to automatically configure one or more elements of the cloud computing environment in association with the software application. The configuration tool additionally includes means for generating deployment instructions indicating how to use the application files and infrastructure configuration data within the cloud computing environment. The configuration tool also includes means for making the application files, the infrastructure configuration data, and the deployment instructions available for download to the user device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 shows an example of a project details page of the user interface of the configuration tool.

DETAILED DESCRIPTION

Figure 1:
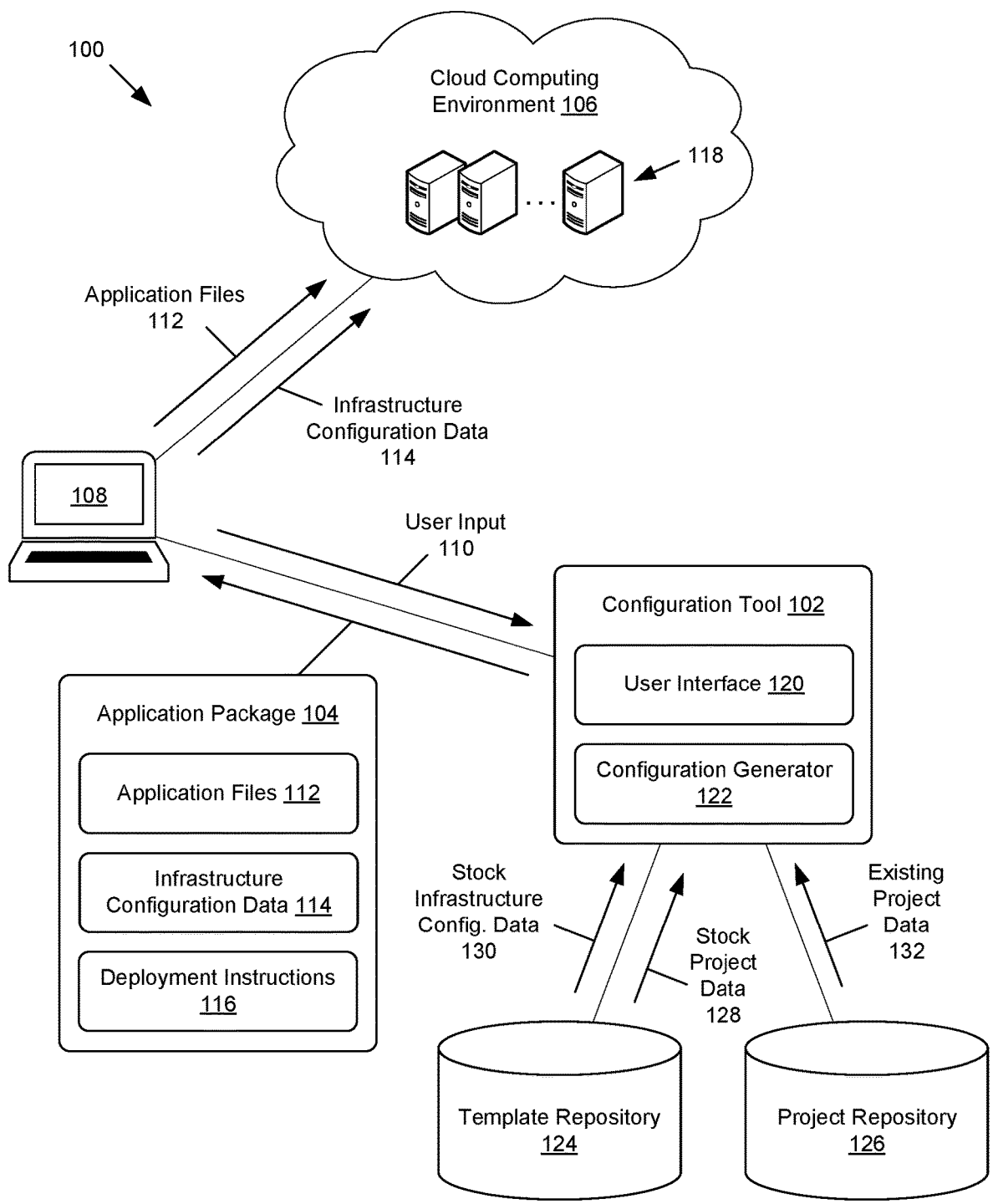
FIG. 1 shows an example environment in which a configuration tool can generate an application package that can be used to configure a cloud computing environment and deploy a software application in the cloud computing environment.

FIG. 1 shows an example environment 100 in which a configuration tool 102 can generate an application package 104 that can be used to configure a cloud computing environment 106 and deploy a software application in the cloud computing environment 106. The software application can be a new application, or an existing application that is to be migrated to the cloud computing environment 106 from another computing environment. In some examples, the application package 104 can be used to deploy the software application to a sandbox and/or test environment within the cloud computing environment 106, for instance to test one or more aspects of the software application within the cloud computing environment 106. In other example, the application package 104 can be used to deploy the software application to a production environment, or any other environment, within the cloud computing environment 106.

The configuration tool 102 can be a web application, or other executable application, that a user can access and use via a user device 108. As an example, the configuration tool 102 can be a web-based HyperText Markup Language (HTML) application. The configuration tool 102 can accept user input 110, associated with a project to deploy a software application to the cloud computing environment 106, from the user via the user device 108. The configuration tool 102 can automatically generate the application package 104 based on the user input 110 as described herein. The user can download the application package 104 generated by the configuration tool 102 to the user device 108, and use the application package 104 to configure the cloud computing environment 106 to execute the software application.

The application package 104, generated by the configuration tool 102, can include application files 112, infrastructure configuration data 114, and deployment instructions 116 associated with the software application. The software application can be deployed in the cloud computing environment 106 by transferring the application files 112 and the infrastructure configuration data 114 from the user device 108 or another computing device to the cloud computing environment 106 according to the deployment instructions 116. The deployment instructions 116 can be dynamically generated by the configuration tool 102 to include customized instructions, based on the user input 110, details associated with the application files 112 and/or details associated with the infrastructure configuration data 114. The infrastructure configuration data 114 can automatically configure the cloud computing environment 106 so that the cloud computing environment 106 can execute the software application based on the application files 112.

The cloud computing environment 106 can include computing elements 118, such as servers and/or other computing devices, that provide computing resources to store data, execute software, and/or provide other services for customers of the cloud computing environment 106. The computing resources provided by the cloud computing environment 106 can include physical computing resources and/or virtual computing resources. Virtual computing resources can include virtual machines, containers, and/or other virtual computing resources. For example, the cloud computing environment 106 can use an image associated with a software application to spin up and maintain virtual machines and/or containers that execute different instances of the software application.

As a non-limiting example, the cloud computing environment 106 can be an Amazon Web Services® (AWS®) cloud computing environment. The AWS® cloud computing environment may provide an Elastic Container Service (ECS) that orchestrates containers and can deploy, manage, and/or scale containerized software applications within Elastic Compute Cloud (EC2) instances in the AWS® cloud computing environment. The AWS® cloud computing environment may also provide services, such as "Fargate" services, that can be used with ECS to run containerized software applications without directly managing servers or clusters of EC2 instances, and/or without provisioning, configuring, or scaling clusters of virtual machines to run containers. In other examples, the cloud computing environment 106 can be any other cloud computing environment, such as cloud computing environments provided by Microsoft®, Google®, Oracle®, and other providers of cloud computing environments.

As described herein, the application package 104 generated and provided by the configuration tool 102 can simplify deployment of a software application in the cloud computing environment 106. As an example, a user who does not have experience configuring computing resources in the cloud computing environment 106 and/or deploying software applications in the cloud computing environment 106 may provide user input 110 that causes the configuration tool 102 to generate the application package 104 associated with the software application. The user can use the application package 104 generated and provided by the configuration tool 102 to automatically configure computing resources in the cloud computing environment 106 for the software application, and to deploy the software application in the cloud computing environment 106. For example, the user can read and follow the customized deployment instructions 116 to determine how to upload the application files 112 and/or infrastructure configuration data 114 to the computing elements 118 of the cloud computing environment 106, how to use the infrastructure configuration data 114 to automatically configure infrastructure of the cloud computing environment 106 in association with the software application, and/or how to cause the cloud computing environment 106 to execute the software application based on the application files 112.

As an example, the infrastructure configuration data 114 provided in the application package 104 can, when provided to the cloud computing environment 106 and/or executed in the cloud computing environment 106, automatically configure computing resources within the cloud computing environment 106 to execute the software application based on the application files 112. The infrastructure configuration data 114 can include "infrastructure as code" data, such as "Terraform" data or other types of "infrastructure as code" data. The "infrastructure as code" in the infrastructure configuration data 114 can define types of computing resources to be used within the cloud computing environment 106 to execute the software application, such as containers, virtual machines, and/or other computing resources. The "infrastructure as code" in the infrastructure configuration data 114 can also define execution operations that can be executed within the cloud computing environment 106 to create, update, destroy, and/or otherwise manage the defined types of computing resources within the cloud computing environment 106 in association with the software application. The infrastructure configuration data 114 can accordingly be used in the cloud computing environment 106 to automatically configure computing resources in the cloud computing environment 106 to execute the software application.

A user can access the configuration tool 102 via the user device 108. The user can use the user device 108 to provide user input 110 to the configuration tool 102, as discussed further below. The user device 108 can also download or otherwise receive and/or store the application package 104 generated by the configuration tool 102, and/or transfer the application files 112 and/or infrastructure configuration data 114 in the application package 104 to the cloud computing environment 106. The user device 108 can be a laptop computer, desktop computer, workstation, mobile computing device, or any other type of computing device that can be used by a user.

In some examples, elements of the configuration tool 102 can execute on one or more computing devices or systems that are separate from, and/or remote from, the user device 108. For example, one or more elements of the configuration tool 102 can execute on computing elements 118 in the cloud computing environment 106, or in other servers or computing devices that are remote from the user device 108. An example system architecture for a computing system that can execute one or more elements of the configuration tool 102 is described below with respect to FIG. 5. The user device 108 can access such remote elements of the configuration tool 102 over the Internet or another network connection. As an example, the configuration tool 102 can be a web application or component of a website that is hosted on a server, such that the configuration tool 102 can be accessed via a web browser executing on the user device 108. In other examples, one or more elements of the configuration tool 102 can execute locally on the user device 108. As an example, the configuration tool 102 can be a mobile application or other executable application that executes at least in part on the user device 108.

The configuration tool 102 can have a user interface 120 that can be accessed and used by a user via the user device 108. The user can use the user interface 120, via the user device 108, to provide user input 110 to the configuration tool 102. As discussed further below with respect to FIG. 2 and FIG. 3, the user input 110 can indicate information, associated with the software application to be deployed in the cloud computing environment 106, that can be used by the configuration tool 102 to generate the corresponding application package 104.

The user interface 120 can be a graphical user interface or other user interface displayed via a website, web application, mobile application, executable application, or any other type of user-facing element associated with the configuration tool 102. The user interface 120 can display fields, options, prompts, user-selectable elements, and/or other elements that request and/or accept user input 110 associated with different types of information, as discussed further below with respect to FIG. 2 and FIG. 3. For example, the user interface 120 can request that a user enter information regarding a programming language associated with a software application to be deployed in the cloud computing environment 106, an indication of whether the software application is a new application or an existing application that is to be migrated to the cloud computing environment 106 from another computing environment, other details about the software application, and/or other details about a project to deploy the software application to the cloud computing environment 106.

A configuration generator 122 of the configuration tool 102 can, in response to the user input 110, retrieve data from a template repository 124 and/or a project repository 126 as described further below. The configuration generator 122 can also use the user input 110 and the retrieved data to automatically generate the application package 104. For example, the configuration generator 122 can use information provided in the user input 110 to modify one or more copies of data retrieved from the template repository 124 and/or the project repository 126, to create the application files 112 and/or infrastructure configuration data 114 of the application package 104. Modification of the retrieved data can include adding new files, deleting files, and/or modifying data within retrieved files. The configuration generator 122 can also dynamically generate customized deployment instructions 116 of the application package 104 based on the user input 110, and/or modifications made to the application files 112 and/or infrastructure configuration data 114 based on the user input 110.

The template repository 124 can include one or more databases, file repositories, code repositories, or other repositories that store templates for stock project data 128 and/or stock infrastructure configuration data 130. Similarly, the project repository 126 can include one or more databases, file repositories, code repositories, or other repositories that store existing project data 132 associated with an existing software application that is to be migrated from another computing environment to the cloud computing environment 106. The template repository 124 and the project repository 126 can, for example, be GitLab® repositories, GitHub® repositories, or other repositories that store stock project data 128, stock infrastructure configuration data 130, and/or existing project data 132.

Stock project data 128 stored in the template repository 124 can include pre-defined source code and/or other project data for a starter application or shell application that can execute in the cloud computing environment 106. For example, the stock project data 128 may have a minimal amount of pre-written code indicating basic libraries, basic executable functions, and/or other basic elements that are sufficient to allow the starter application to be executed by the computing elements 118 of the cloud computing environment 106, but otherwise be blank and/or devoid of features. The template repository 124 may store different versions of the stock project data 128, such as pre-defined source code and/or other project data written in different programming languages. As discussed further below, the configuration tool 102 can automatically modify one or more copies of stock project data 128, based on the user input 110, to generate application files 112 of the application package 104.

Stock infrastructure configuration data 130 stored in the template repository 124 can include default Terraform code, or other default "infrastructure as code" data, that defines default types of computing resources to be used within the cloud computing environment 106 to execute a software application, such as containers, virtual machines, and/or other computing resources. The stock infrastructure configuration data 130 can also define default execution operations that can, within the cloud computing environment 106, create, update, destroy, and/or otherwise manage the defined default types of computing resources within the cloud computing environment 106. As discussed further below, in some examples the configuration tool 102 can automatically modify one or more copies of stock infrastructure configuration data 130, based on the user input 110, to generate infrastructure configuration data 114 of the application package 104. In other examples, the configuration tool 102 can use the stock infrastructure configuration data 130 as the infrastructure configuration data 114 of the application package 104.

The existing project data 132 stored in the project repository 126 can be existing source code and/or other project data for an existing software application that is to be migrated to the cloud computing environment 106. The existing software application may be configured, based on the existing project data 132, to be executed in a different computing environment than the cloud computing environment 106. For example, the existing project data 132 can be source code for a software application that is configured to execute in an on-premise computing environment or another computing environment different from the cloud computing environment 106. As discussed further below, the configuration tool 102 can automatically modify one or more copies of the existing project data 132, based on the user input 110, to generate application files 112 of the application package 104 such that the software application can execute in the cloud computing environment 106.

The template repository 124 may be a default or dedicated repository configured to store templates for the stock project data 128 and/or the stock infrastructure configuration data 130 that can be used by the configuration tool 102. The project repository 126 may be the same as the template repository 124, or may be a different repository. As discussed above, the project repository 126 can store existing project data 132, such as code and/or other data, for an existing software application that is to be migrated to the cloud computing environment 106. If an existing software application is to be migrated to the cloud computing environment 106, the user input 110 provided to the configuration tool 102 can identify the identity and/or location of the project repository 126, and/or a directory or other location within the project repository 126, that stores the existing project data 132 associated with the existing software application.

The user input 110 may provide authentication credentials that the configuration tool 102 can use to access, and establish one or more sessions with, the template repository 124 and/or the project repository 126. Accordingly, the configuration tool 102 can use such sessions to retrieve copies of stock project data 128 and/or stock infrastructure configuration data 130 from the template repository 124, and/or to retrieve existing project data 132 from the project repository 126. For example, the authentication credentials provided in the user input 110 can be an authentication token for a GitLab® repository or other type of repository, or a username and password for Lightweight Directory Access Protocol (LDAP) authentication or another type of authentication.

As discussed above, the configuration tool 102 can retrieve copies of stock project data 128 and/or stock infrastructure configuration data 130 from the template repository 124, and/or retrieve existing project data 132 from the project repository 126. The configuration tool 102 can also use information provided in the user input 110 to modify retrieved copies of stock project data 128, stock infrastructure configuration data 130, and/or existing project data 132, to generate the application files 112 and infrastructure configuration data 114 of the application package 104.

As a first example, if the software application to be deployed in the cloud computing environment 106 is a new application, the user input 110 may indicate a selected programming language. The configuration generator 122 may retrieve a copy of stock project data 128 that includes code for a starter application that is pre-written in the selected programming language indicated by the user input 110. The stock project data 128 for the starter application may, for instance, be a template that has a minimal amount of pre-written code indicating basic libraries, basic executable functions, and/or other basic elements that are sufficient to allow the starter application to be executed by the computing elements 118 of the cloud computing environment 106, but otherwise be blank and/or devoid of features. Accordingly, the copy of the stock project data 128 for the starter application can include code for a shell application that is executable within the cloud computing environment 106, but that a programmer may later edit to add additional code that defines software features.

The configuration generator 122 may also retrieve a copy of the stock infrastructure configuration data 130. The stock infrastructure configuration data 130 can be default Terraform code, or other default "infrastructure as code" data, that defines default types of computing resources to be used within the cloud computing environment 106 to execute the software application, such as containers, virtual machines, and/or other computing resources. The stock infrastructure configuration data 130 can also define default execution operations that can, within the cloud computing environment 106, create, update, destroy, and/or otherwise manage the defined default types of computing resources within the cloud computing environment 106.

After retrieving copies of the stock project data 128 for a starter application and the stock infrastructure configuration data 130, the configuration generator 122 can modify the retrieved copies of the stock project data 128 and/or the stock infrastructure configuration data 130 based on additional details provided in the user input 110, in order to generate application files 112 and/or infrastructure configuration data 114 for the application package 104. As an example, the stock project data 128 can include one or more default application files 112 that are named with default filenames. However, the configuration generator 122 can use a project name, defined in the user input 110, to change a filename associated with one of the application files 112 from a default filename to a customized filename that includes or corresponds with the project name defined in the user input 110. As another example, the configuration generator 122 can use infrastructure options and/or details defined by the user input 110 to adjust information within the infrastructure configuration data 114 to be different from default information provided in the stock infrastructure configuration data 130.

In some examples, the configuration generator 122 may modify at least one file in the stock project data 128 and/or the stock infrastructure configuration data 130, but may leave other files in the stock project data 128 and/or the stock infrastructure configuration data 130 unmodified. For example, the configuration generator 122 may modify stock project data 128 to generate application files 112 of the application package 104, but use unmodified stock infrastructure configuration data 130 as the infrastructure configuration data 114 of the application package 104. However, in other examples, the configuration generator 122 may modify both the stock project data 128 and/or the stock infrastructure configuration data 130 to generate the application files 112 and the infrastructure configuration data 114 of the application package 104.

As a second example, if the software application to be deployed in the cloud computing environment 106 is an existing application that is to be migrated to the cloud computing environment 106, the user input 110 may identify the project repository 126 that stores existing project data 132 associated with the existing application. The existing project data 132 can, for example, be current code that is used to execute and/or deploy the existing application in a different computing environment. For instance, if the existing application is currently configured to execute in an on-premise computing environment, and is to be migrated from the on-premise computing environment to the cloud computing environment 106, the existing project data 132 can be existing code that is used to execute the existing application in the on-premise computing environment.

The user input 110 may indicate authentication credentials, such as an authentication token or username and password, that allows the configuration tool 102 to establish a session with the project repository 126 and retrieve a copy of the existing project data 132 associated with the existing application from the project repository 126. The configuration generator 122 may also retrieve a copy of the stock infrastructure configuration data 130, such as default Terraform code or other default "infrastructure as code" data, from the template repository 124.

After retrieving copies of the existing project data 132 for the existing application that is to be migrated and the stock infrastructure configuration data 130, the configuration generator 122 can modify the retrieved copies of the existing project data 132 and/or the stock infrastructure configuration data 130 based on additional details provided in the user input 110, in order to generate application files 112 and/or infrastructure configuration data 114 for the application package 104. For example, if the software application is being migrated from an on-premise computing environment to the cloud computing environment 106, the configuration generator 122 can edit the retrieved copy of the existing project data 132, to generate one or more application files 112, by automatically removing existing references to elements of the on-premise computing environment and/or by automatically adding references to elements of the cloud computing environment 106. As another example, the configuration generator 122 can use infrastructure options and/or details defined by the user input 110 to adjust information within the infrastructure configuration data 114 to be different from default information provided in the stock infrastructure configuration data 130.

In some examples, the configuration generator 122 may modify at least one file in the existing project data 132 and/or the stock infrastructure configuration data 130, but may leave other files in the existing project data 132 and/or the stock infrastructure configuration data 130 unmodified. For example, the configuration generator 122 may modify existing project data 132 to generate application files 112 of the application package 104, but use unmodified stock infrastructure configuration data 130 as the infrastructure configuration data 114 of the application package 104. However, in other examples, the configuration generator 122 may modify both the existing project data 132 and/or the stock infrastructure configuration data 130 to generate the application files 112 and the infrastructure configuration data 114 of the application package 104.

In addition to modifying retrieved copies of the stock project data 128, the stock infrastructure configuration data 130, and/or the existing project data 132 as described above, the configuration generator 122 can also dynamically generate customized deployment instructions 116 based on the user input 110, data retrieved from the template repository 124 and/or project repository 126, and/or modifications made to the data retrieved from the template repository 124 and/or project repository 126. The configuration tool 102 can accordingly customize the deployment instructions 116 based on attributes of the application files 112 and/or the infrastructure configuration data 114 included within the application package 104 for a particular software application to be deployed in the cloud computing environment 106, such that the deployment instructions 116 are dynamically generated to uniquely correspond with a project to deploy the particular software application in the cloud computing environment 106. A user can read and follow the deployment instructions 116 to, based on the application files 112 and the infrastructure configuration data 114, cause the cloud computing environment 106 to be configured for the particular software application and to execute the particular software application.

The deployment instructions 116, dynamically generated by the configuration tool 102, can indicate step-by-step instructions, example commands, and/or other operations or information that a user can use to transfer the application files 112 and/or infrastructure configuration data 114 to the cloud computing environment 106 and cause the application files 112 and/or infrastructure configuration data 114 to be used within the cloud computing environment 106. For example, the deployment instructions 116 can identify Uniform Resource Locators (URLs), application programming interfaces (APIs), and/or other interfaces or elements that can be used to transfer the application files 112 and/or infrastructure configuration data 114 to the cloud computing environment 106. The deployment instructions 116 can also indicate operations that the user can perform, and/or commands for such operations that the user can provide to the cloud computing environment 106, for instance to cause the infrastructure configuration data 114 to automatically configure infrastructure of the cloud computing environment 106 and/or to cause the cloud computing environment 106 to execute the software application based on the application files 112.

In some examples, the deployment instructions 116 dynamically generated by the configuration tool 102 can include copies of commands, such as text of command line commands, that a user can copy from the deployment instructions 116 and paste into command line interface (CLI) or an interface of the cloud computing environment 106 in order to execute the commands within the cloud computing environment 106. In other examples, the deployment instructions 116 and/or application files 112 dynamically generated by the configuration tool 102 can also, or additionally, include a script of commands that can be used to automatically execute commands in the script within the cloud computing environment 106. For example, a script can include a series of commands that, when the script is executed, cause the series of commands to be executed in the cloud computing environment 106 to configure the cloud computing environment 106 and/or execute the software application in the cloud computing environment 106.

The deployment instructions 116 can, for example, include a list of prerequisite steps that a user should ensure have been followed to deploy the software application in the cloud computing environment 106. As a non-limiting example, the deployment instructions 116 can instruct a user to make sure that a container platform, such as Docker®, has been installed, that a proxy has been enabled, that a "Terraform" CLI has been installed, that a CLI associated with the cloud computing environment 106 has been installed, that the user has been granted with access privileges to modify and/or update the cloud computing environment 106, and/or that other prerequisites have been completed. The deployment instructions 116 can include additional instructions that the user can follow to complete the prerequisites.

The deployment instructions 116 can also include a series of steps to be followed sequentially after the prerequisites have been completed. The series of steps can be customized based on the user input 110 and/or information associated with the application files 112 and/or the infrastructure configuration data 114 of the application package 104. As a non-limiting example, the deployment instructions 116 may indicate that the user should first login to a sandbox environment in the cloud computing environment 106, and obtain credential information. The deployment instructions 116 can also provide an example command that the user can type into a CLI, or copy and paste into the CLI, to login into the sandbox environment and obtain the credential information. In this non-limiting example, the deployment instructions 116 may indicate that the user should proceed to, in order, populate environment variables for Terraform, navigate to a Terraform directory to initialize a Terraform project, set up ECS Fargate infrastructure via Terraform, navigate back to a main level of the project, compile application files 112 into a .jar file, build a docker image, ensure that a current working directory has a Dockerfile, login to Docker® via the cloud computing environment 106, push a Docker image, verify that a service is in a container console presented via the cloud computing environment 106, and finally tear down the configured infrastructure in the cloud computing environment 106 once the software application has been tested and/or is no longer needed within the cloud computing environment 106. The deployment instructions 116 can include specific commands, such as CLI commands, that the user can type into a CLI, or copy and paste into the CLI, to perform individual steps in the sequence.

Accordingly, in this non-limiting example, a user can follow the steps provided in the deployment instructions 116 and use the commands provided in the deployment instructions 116 to configure infrastructure of the cloud computing environment 106 and get the software application running in the cloud computing environment 106. The user can thus follow the deployment instructions 116 to get the software application running in the cloud computing environment 106 even if the user is not familiar with Terraform, Docker, ECS Fargate, and/or other systems or platforms that are involved in the process and are referenced in the deployment instructions 116, and/or if the user would not otherwise have the skill or experience to generate corresponding commands for one or more individual steps of the process described by the deployment instructions 116.

The configuration tool 102 can, in some examples, dynamically generate the deployment instructions 116 at least in part based on modifications made to copies of stock project data 128, stock infrastructure configuration data 130, and/or existing project data 132, such that instructions, commands, and/or other information within the deployment instructions 116 correspond with those changes. As an example, if the configuration generator 122 changed a filename of one of the application files 112 away from a default filename provided in retrieved stock project data 128 to a customized filename that corresponds to a project name defined in the user input 110, the configuration generator 122 can generate customized deployment instructions 116 that reference the customized filename within instructions informing a user how to upload and/or deploy that application file, within example commands associated with the application file provided within the customized deployment instructions 116, and/or within other elements of the customized deployment instructions 116.

The deployment instructions 116 can be customized for a particular project to deploy a particular software application to the cloud computing environment 106. Accordingly, the configuration tool 102 can generate different deployment instructions 116, for different projects to deploy different software applications to the cloud computing environment 106, that may include instructions for a different series of steps, and/or include different commands, based on different information provided in user input 110 for the different projects, different modifications made to stock project data 128, stock infrastructure configuration data 130, and/or existing project data 132, and/or other differences. For example, if users associated with different projects to deploy different software applications to the cloud computing environment 106 provide different user input 110 to the configuration tool 102, the configuration tool 102 can generate correspondingly different customized deployment instructions 116 for the different projects that may instruct the users to navigate to different directories, provide different commands, and/or otherwise proceed differently to configure the cloud computing environment 106 and deploy the different software applications in the cloud computing environment 106.

After generating the application files 112, the infrastructure configuration data 114, and the deployment instructions 116 in response to user input 110, the configuration tool 102 can bundle the generated application files 112, infrastructure configuration data 114, and deployment instructions 116 into the application package 104. The configuration tool 102 can also transfer the application package 104 to the user device 108, or make the application package 104 available to be transferred to the user device 108. For example, the application package 104 can be archived into and/or provided as a ZIP file, or other type of archive file, that can be downloaded by the user device 108, for instance in response to a user selecting a "download" option via the user interface 120. In other examples, the generated application files 112, infrastructure configuration data 114, and/or deployment instructions 116 can be separately downloaded or otherwise transferred to the user device 108.

The user can read and follow the deployment instructions 116 to deploy the software application in the cloud computing environment 106, for instance by using the user device 108 to transfer the application files 112 and the infrastructure configuration data 114 to the cloud computing environment 106 according to the deployment instructions 116. For instance, as discussed above, the deployment instructions 116 can provide customized step-by-step instructions that the user can follow, specific text of customized command line commands that the user can enter into a CLI in order to transfer and/or use the application files 112 and the infrastructure configuration data 114, and/or other information that the user and/or the user device 108 can use to deploy the software application in the cloud computing environment 106. In some examples, the application files 112 generated by the configuration tool 102 can include a shell script of commands that can be executed to transfer and/or use the application files 112 and the infrastructure configuration data 114, and the deployment instructions 116 can indicate commands and/or user instructions that the user can follow to cause execution of the shell script.

By uploading and using the infrastructure configuration data 114 provided in the application package 104, the infrastructure configuration data 114 can automatically configure computing resources in the cloud computing environment 106 so that the cloud computing environment 106 can execute the software application based on the application files 112. For instance, execution of the infrastructure configuration data 114 in the cloud computing environment 106 can cause a container, a virtual machine, and/or other computing resources to be automatically set up and configured within the cloud computing environment 106 in order to execute the software application based on the application files 112. Accordingly, even if a user attempting to deploy the software application in the cloud computing environment 106 is otherwise unfamiliar with how to configure one or more types of infrastructure in the cloud computing environment 106, the infrastructure configuration data 114 in the application package 104 can automatically configure infrastructure of the cloud computing environment 106 to execute the software application.

As discussed above, in some examples, the application package 104 can be associated with a new starter application. By generating the application package 104 via the configuration tool 102, a user can use the application package 104 to deploy the new starter application in the cloud computing environment 106. After the new starter application has been deployed in the cloud computing environment 106, a programmer may edit the application files 112 to add new features, for instance to build out features of the software application, test elements of the software application, and/or use the starter application for other purposes.

As an example, if a software developer is developing a new API, the software developer may want to test whether the API can be used successfully by software applications that execute within the cloud computing environment 106. Although the software developer may be tasked with developing the API, the software developer may not be familiar with how to configure and deploy a software application in the cloud computing environment 106. However, the software developer can use the configuration tool 102 to generate the application package 104 for a new starter application that will be or use the new API, and use the application package 104 to configure the cloud computing environment 106 to run the new starter application. The software developer can then add code to the application files 112 for the starter application, such that the new API can be tested in association with the cloud computing environment 106. Accordingly, even if the software developer is an API developer and would not otherwise have the skill or experience to deploy an application to the cloud computing environment 106, the software developer can use the configuration tool 102 to quickly get a starter application running within the cloud computing environment 106 such that the starter application can be used as an the API.

In other examples, the application package 104 can be associated with an existing application that is being migrated to the cloud computing environment 106 from a different computing environment. By generating the application package 104 via the configuration tool 102, a user can use the application package 104 to deploy the existing application in the cloud computing environment 106 without making manual modifications to the existing application. For example, the configuration tool 102 may adapt the existing application to execute within the cloud computing environment 106 by modifying some existing code and/or data associated with the existing application, such as by replacing dependencies and other references to the different computing environment with corresponding dependencies and references to elements of the cloud computing environment 106. The configuration tool 102 may, however, leave other code and/or data associated with features of the existing application unchanged, such that those features can operate within the cloud computing environment 106 without being recoded. Accordingly, the existing application can be deployed to the cloud computing environment 106 from another computing environment relatively quickly and with minimal manual effort. In some cases, once the existing application is running within the cloud computing environment 106, further development can be performed to optimize the application to run in the cloud computing environment 106. However, the application package 104 can be used to get the existing application running within the cloud computing environment 106 relatively quickly, such that a cloud version of the existing application can be tested and/or executed for other purposes.

As discussed above, a software developer or other user who may not otherwise have the skill or experience to deploy a new software application in the cloud computing environment 106, or to migrate an existing software application in the cloud computing environment 106, can use the configuration tool 102 to automatically generate the application package 104 such that the application package 104 can be used to automatically configure the cloud computing environment 106 and execute the software application in the cloud computing environment 106. The application package 104 can accordingly allow a new or existing software application to be deployed in the cloud computing environment 106 more quickly, and with less user skill and experience, than other deployment processes.

For example, deployment to the cloud computing environment 106 may be a multiple-step process that involves numerous systems and platforms, such as Docker, ECS Fargate, Terraform, and/or other systems. Often, users may not be familiar with all of the different systems that may be involved at one or more steps of the deployment process, such that teams of different users with different skills may otherwise be involved in deploying a new or existing software application to the cloud computing environment 106 over a relatively lengthy period of time, such as four to six weeks. However, by providing user input 110 associated with to the configuration tool 102 as described above, the configuration tool 102 can generate the application package 104 in a relatively short period of time, such as five minutes or less. A single user may be able to follow the deployment instructions 116 in the application package 104 to configure the cloud computing environment 106 and get the software application running within the cloud computing environment 106 in another relatively short period of time, such as two hours or less. Accordingly, relative to a team of different users using multiple user devices over a period of weeks to perform tasks to deploy a software application to the cloud computing environment 106, the configuration tool 102 can allow a single user associated with the user device 108 to deploy a software application to the cloud computing environment 106 within hours, thereby reducing the overall amount of processing cycles, memory, network bandwidth, and/or other computing resources used to deploy the software application to the cloud computing environment 106.

Overall, the configuration tool 102 can allow a user to provide user input 110 as discussed further below with respect to FIGS. 2 and 3, and cause the configuration tool 102 to automatically generate the application package 104 for a software application based on the user input 110. The user, who may not otherwise be familiar with aspects of the cloud computing environment 106 or have experience or skill with configuring aspects of the cloud computing environment 106, can use the application package 104 to configure the cloud computing environment 106 and deploy the software application in the cloud computing environment 106 within a relatively short period of time, such as a few hours or less. Accordingly, the software application in the cloud computing environment 106 can be deployed in the cloud computing environment 106 more quickly, with fewer computing resources, by fewer users, and/or by users with fewer skills and/or experience, relative to other deployment processes that may take weeks and involve teams of multiple users who have different skills and experience.

Figure 2:
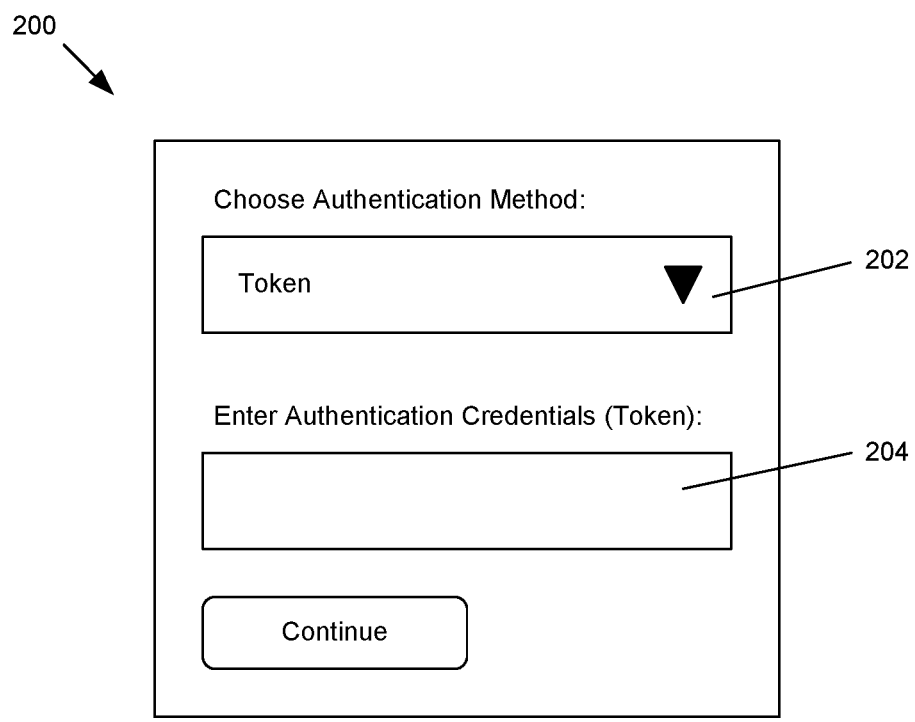
FIG. 2 shows an example of an authentication page of a user interface of the configuration tool.

FIG. 2 shows an example of an authentication page 200 of the user interface 120. The authentication page 200 may be an initial page of the user interface 120 that may be displayed upon loading of the configuration tool 102 by the user device 108. The authentication page 200 can have fields, selectable options, and/or other elements that allow a user to login to the configuration tool 102 by providing authentication credentials associated with the template repository 124 and/or the project repository 126. The authentication credentials may be an authentication token, a username and password, or other types of login, access, or authentication credentials that can be used by the configuration tool 102 to establish a session with, and retrieve copies of data from, the template repository 124 and/or the project repository 126.

As shown in FIG. 2, the authentication page 200 may have an option 202 to select an authentication method, such as a first authentication method that uses an authentication token or second authentication method that uses a username and password combination. The authentication page 200 may also have one or more fields 204 that correspond with a selected authentication method, such as a field in which a user can enter an authentication token, or fields in which a user can enter a username and password.

The configuration tool 102 can attempt to authenticate the user and/or establish a session with the template repository 124 and/or the project repository 126, based on the authentication credentials provided by the user via the authentication page 200. If the authentication is not successful, the authentication page 200 may display an error and/or allow the user to retry providing the authentication credentials. However, if the authentication is successful, the configuration tool 102 can also use a session established with the template repository 124 to retrieve a copy of the stock infrastructure configuration data 130. Additionally, upon a successful authentication based on the authentication credentials provided via the authentication page 200, the user interface 120 can also transition to displaying a project details page 300, as discussed further below with respect to FIG. 3.

FIG. 3 shows an example of the project details page 300 of the user interface 120. The user interface 120 may display the project details page 300 after successful establishment of a session with the template repository 124 and/or the project repository 126 based on authentication credentials provided by a user via the authentication page 200, as discussed above with respect to FIG. 2.

The project details page 300 can have fields, selectable options, and/or other elements that allow a user to provide information about a software application that is to be deployed in the cloud computing environment 106. As discussed above, the software application may be a new application, or may be an existing application that is being migrated to the cloud computing environment 106 from a different computing environment. Although the project details page 300 is shown as a single page or view of the user interface 120 in FIG. 3, in some examples different elements of the project details page 300 can be displayed via multiple pages, user interface views, sub-menus, and/or other different or additional elements of the user interface 120.

The project details page 300 can have a language option 302 that allows a user to select a programming language associated with the software application to be deployed in the cloud computing environment 106. For example, the language option 302 provide a list of programming languages that can be used for code associated with the software application. The user can accordingly select, via the language option 302, a programming language associated with the software application. For instance, if the software application is an existing application that is to be migrated to the cloud computing environment 106, the user can use the language option 302 to select a programming language in which code in existing project data 132 associated with the existing application is written. If the software application is instead a new application, the user can use the language option 302 to select a programming language that will be used for code of the new application. For example, the list of programming languages displayed in association with the language option 302 may include programming languages associated with different instances of stock project data 128 stored in the template repository 124.

The project details page 300 can also have a migration option 304. The migration option 304 can allow a user to identify whether the software application, to be deployed in the cloud computing environment 106, is a new application or is instead an existing application that is being migrated from another computing environment.

The project details page 300 can also have a project name field 306. The project name field 306 can allow a user to enter a project name to be associated with the software application. As described further herein, the project name entered by the user via the project name field 306 can be used by the configuration tool 102 to modify default or existing data, when generating the application package 104, to reflect the project name entered by the user.

The project details page 300 can also have a project repository information field 308. If the software application is an existing application that is being migrated from another computing environment to the cloud computing environment 106, the project repository information field 308 can allow a user to enter information about the project repository 126 that stores the existing project data 132 for the existing application. For instance, the project repository information field 308 can accept information, such as a name, URL, or other information identifying a directory or other location within the project repository 126 where the existing project data 132 is stored.

Accordingly, if the user indicates via the migration option 304 that the software application is an existing application that is being migrated to the cloud computing environment 106, the configuration tool 102 can use information entered into the project repository information field 308 to locate and retrieve a copy of existing project data 132, associated with the existing application, stored in the project repository 126. For example, the configuration tool 102 can use a session established with the project repository 126, using authentication credentials provided via the authentication page 200, to access a directory within the project repository 126 based on information entered into the project repository information field 308, and retrieve a copy of the existing project data 132. If the user instead indicated via the migration option 304 that the software application is a new application that is not being migrated, the configuration tool 102 can instead retrieve a copy of stock project data 128 that corresponds to the programming language selected by the user via the language option 302.

The project details page 300 can also have additional fields 310 that a user can use to enter additional types of information associated with the project to deploy the software application to the cloud computing environment 106. For instance, the additional fields 310 can allow a user to enter a team name, such as a name of a software development team or other team, that may manage and/or develop the software application. The additional fields 310 can also allow the user to enter an email address associated with the team, a department name or identifier associated with the team, information about a use case associated with the software application, an indication of whether the software application is to be shut down within the cloud computing environment 106 during times designated as "off hours," a workgroup associated with the software application, and/or other details and information associated with the software application or the project to deploy the software application to the cloud computing environment 106.

The project details page 300 can also have a gateway type option 312. The gateway type option 312 can allow a user to select whether the software application will be associated with a private gateway or a public gateway within the cloud computing environment 106. The public gateway may allow the software application to be publicly accessible by any user or system, while the private gateway may allow the software application to be accessed by users and/or systems associated with a particular entity.

The project details page 300 can also have a secrets manager option 314. The secrets manager option 314 can allow a user to select whether secrets that may be used within the cloud computing environment 106 in association with the software application should be stored by the cloud computing environment 106. Such secrets may include key-value pairs including username and password combinations, database credentials, API keys, and/or other secrets. If a user indicates via the secrets manager option 314 that secrets should be stored by the cloud computing environment 106, the project details page 300 can also accept user entry of values for one or more secrets via one or more secrets fields 316.

After a user has provided user input 110 about the software application via the language option 302, the migration option 304, the project name field 306, project repository information field 308, the additional fields 310, the gateway type option 312, the secrets manager option 314, and/or the secrets fields 316 of the project details page 300, the user may select an application package generation option 318 on the project details page 300. Selection of the application package generation option 318 can cause the configuration tool 102 to generate the application package 104 based on the user input 110, for instance as discussed further below with respect to FIG. 4. When the configuration tool 102 has generated the application package 104, the user can select a download application package option 320 to download the application package 104 to the user device 108 from the configuration tool 102. For example, selection of the download application package option 320 can cause the application package 104 to be downloaded to the user device 108 as a ZIP file, or as one or more other types of files.

In some examples, individual options, fields, and/or other elements of the project details page 300 may be designated as required or optional. The project details page 300 may be configured to enable the application package generation option 318 once all of a set of required elements on the project details page 300 have been selected or filled in by the user. However, other elements on the project details page 300 may be optional, such that the user can decline to select or fill in such optional elements and still select the application package generation option 318.

In other examples, some of the options, fields, and/or other elements of the project details page 300 may be inaccessible or hidden on the project details page 300 until other options, fields, and/or other elements of the project details page 300 have been selected or filled in by a user. For example, because the project repository information field 308 may not be relevant to a new software application, the project repository information field 308 may be hidden or inaccessible unless a user indicates via the migration option 304 that an existing software application is to be migrated to the cloud computing environment 106. As another example, the secrets fields 316 may be hidden or inaccessible unless a user chooses to enable a secrets manager via the secrets manager option 314. As another example, the download application package option 320 can be hidden or inaccessible until a user has selected the application package generation option 318 and the configuration tool 102 has completed generation of the application package 104. As another example, options related to migrating a software application from another computing environment, such as the migration option 304, the project repository information field 308, and/or other options, may be hidden or inaccessible unless a user selects a particular programming language, such as Java or another programming language, via the language option 302.

Overall, a user can provide user input 110 via the elements of the authentication pages 200 and/or the project details page 300 of the user interface 120 shown in FIGS. 2 and 3. When the user selects the application package generation option 318, the configuration tool 102 can use user input 110 to retrieve data from the template repository 124 and/or from the project repository 126. The configuration tool 102 can also generate the application files 112 and/or infrastructure configuration data 114 based on the retrieved data and/or the user input 110, dynamically generate customized deployment instructions 116, and provide the application files 112, the infrastructure configuration data 114, and the deployment instructions 116 as the application package 104. An example of the configuration tool 102 receiving user input 110 and generating the application package 104 is discussed further below with respect to FIG. 4.

Figure 4:
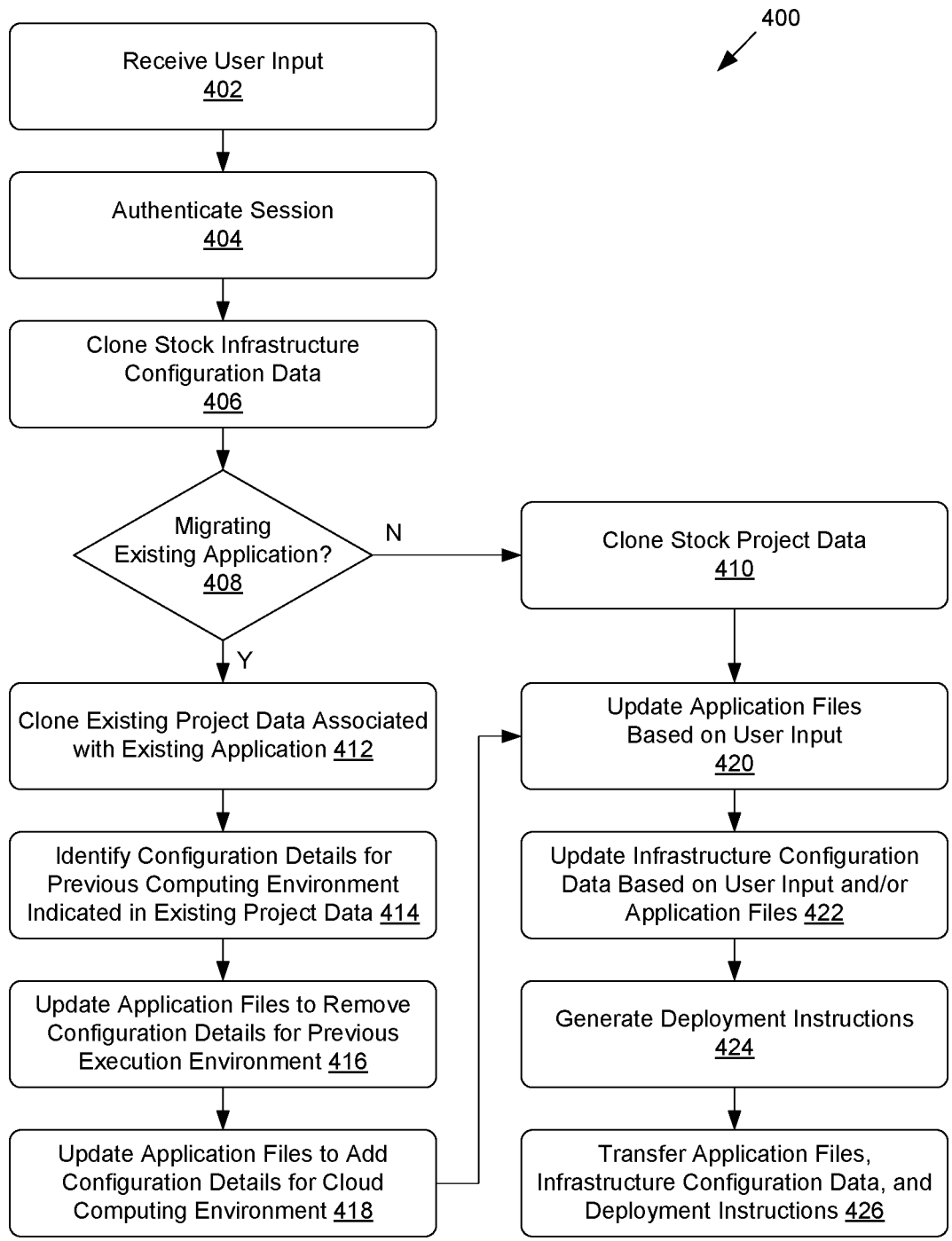
FIG. 4 shows a flowchart illustrating an example method for generating the application package via the configuration tool.

FIG. 4 shows a flowchart illustrating an example method 400 for generating the application package 104 via the configuration tool 102. The method 400 shown in FIG. 4 can be performed by a computing system that executes the configuration tool 102. An example system architecture for such a computing system is described below with respect to FIG. 5.

At block 402, the configuration tool 102 can receive, from the user device 108, user input 110 associated with a project to deploy a software application in the cloud computing environment 106. The user input 110 can be provided via the user interface 120, such as via the authentication page 200 and/or the project details page 300 shown in FIG. 2 and FIG. 3. The user input 110 can indicate authentication credentials, a selected programming language, an indication of whether the software application is a new application or an existing application that is to be migrated to the cloud computing environment 106 from another computing environment, other details about the software application, and/or other details about a project to deploy the software application to the cloud computing environment 106.

At block 404, the configuration tool 102 can authenticate at least one session with the template repository 124 and/or project repository 126 based on authentication credentials, an identification of the project repository 126, and/or other information provided within the user input 110 received at block 402. As an example, the configuration tool 102 can authenticate at least one session with the template repository 124 by calling a sign-in URL associated with the template repository 124, fetching an authentication token from the template repository 124, combining the authentication token with an authentication credential provided in the user input 110, and calling a login URL associated with the template repository 124. If the authentication fails, the configuration tool 102 may display an error and/or request that the user provide corrected authentication information. However, if the authentication is successful, the configuration tool 102 can register an authentication session with the template repository 124 and/or project repository 126.

At block 406, the configuration tool 102 can clone the stock infrastructure configuration data 130 from the template repository 124. For example, the configuration tool 102 can retrieve a copy of the stock infrastructure configuration data 130 from the template repository 124. The cloned copy of the stock infrastructure configuration data 130 can be used as, or be modified into, the infrastructure configuration data 114 of the application package 104. As discussed above, the stock infrastructure configuration data 130 can be default Terraform code, or other default "infrastructure as code" data, that can automatically configure infrastructure of the cloud computing environment 106.

At block 408, the configuration tool 102 can determine, based on the user input 110 received at block 402, whether the software application to be deployed in the cloud computing environment 106 is an existing application that is to be migrated to the cloud computing environment 106. For example, the configuration tool 102 can determine whether the user input 110 included selection of the migration option 304, shown in FIG. 3, to indicate that the software application is an existing application that is to be migrated.

If the configuration tool 102 determines that the software application is a new application, and is not an existing application that is to be migrated to the cloud computing environment 106 (Block 408-No), the configuration tool 102 can clone stock project data 128 associated with a starter application from the template repository 124 at block 410. The configuration tool 102 can clone an instance of the stock project data 128 that corresponds to a programming language selected by the user via the user input 110 received at block 402. In some examples, different instances of the stock project data 128 may be accessible via different URLs or directories within the template repository 124, such that the configuration tool 102 can retrieve a copy of the instance of the stock project data 128 that uses the user-selected programming language via a corresponding URL or directory within the template repository 124. The cloned copy of the existing project data 132 can be used as, and be modified into, the application files 112 of the application package 104 as described further below with respect to block 420.

If the configuration tool 102 instead determines that the software application is an existing application that is to be migrated to the cloud computing environment 106 (Block 408—Yes), the configuration tool 102 can clone existing project data 132 associated with the existing application from the project repository 126 at block 412. For example, the configuration tool 102 can retrieve a copy of the existing project data 132 from the project repository 126. The cloned copy of the existing project data 132 can be used as, and be modified into, the application files 112 of the application package 104 as described further below with respect to blocks 414-420.

At block 414, the configuration tool 102 can determine configuration details associated with a previous computing environment indicated in application files 112, based on the cloned copy of the existing project data 132 retrieved at block 412. As discussed above, the existing project data 132 can be configured such that the software application can execute in an on-premise computing environment or other computing environment different from the cloud computing environment 106. The existing project data 132 may accordingly include configuration details associated with the previous computing environment associated with the existing application, and/or include references to computing resources and/or other elements of the previous computing environment. For example, the existing project data 132 may include dependencies that reference services provided by an on-premise computing environment. As another example, the existing project data 132 can include a project object model (POM) file that a software project management tool, such as Apache® Maven, can use to build and/or deploy the software application in the previous computing environment, plugins for the software project management tool, and/or other information relevant to configuration and/or deployment of the application in the previous computing environment. At block 414, the configuration tool 102 can accordingly automatically analyze the existing project data 132 to identify dependencies associated with elements of the previous computing environment, POM file details, references to tools and/or other elements used within the previous computing environment, and/or other existing configuration details.

As an example, the existing project data 132 can include a POM file, such as a "Pom.xml" file, associated with the previous computing environment. The configuration tool 102 can automatically analyze the POM file at block 414 to identify version information, a plugin associated with a software project management tool, a configuration client, an actuator, and/or other configuration information indicated within the POM file.

At block 416, the configuration tool 102 can automatically modify the application files 112, which were initially the cloned copy of the existing project data 132 retrieved at block 412, to remove configuration details associated with the previous computing environment that were identified at block 414. In some examples, the configuration tool 102 may remove identified configuration details by adding slash marks or other characters to comment out, and make inactive, the identified configuration details within code of the application files 112. Accordingly, the configuration details may still be present and readable by developers within the application files 112, but can be inactive such that the configuration details are not used upon execution of the application files 112.

In other examples, the configuration tool 102 can delete identified configuration details from the application files 112. As an example, the configuration tool 102 may delete code within the application files 112 that references configuration details found within the original cloned copy of the existing project data 132. As another example, if the cloned copy of the existing project data 132 retrieved at block 412 included separate configuration files, such as manifest configuration files and/or route configuration files, specific to the previous computing environment, the configuration tool 102 can delete those configuration files at block 416 such that the configuration files are removed from the application files 112.

At block 418, the configuration tool 102 can automatically modify the application files 112 to add dependencies and/or other configuration data associated with the cloud computing environment 106. For instance, based on an analysis of a POM file and/or other existing project data 132 at block 414 to identify dependencies and/or other configuration information that was associated with the previous computing environment, the configuration tool 102 can automatically add corresponding dependencies and/or other configuration information that are associated with the cloud computing environment 106 to the application files 112 at block 418.

As an example, if the existing project data 132 referenced a particular type of dependency to a service associated with the previous computing environment, the configuration tool 102 can automatically modify the application files 112 to add a reference to a similar or corresponding service that is provided in the cloud computing environment 106. As another example, if the user input 110 indicated a user selection, via the secrets manager option 314 and/or one or more secrets fields 316 shown in FIG. 3, to use secrets within the cloud computing environment 106, the configuration tool 102 can automatically modify the application files 112 to add dependencies associated with a secrets manager of the cloud computing environment 106. As another example, the configuration tool 102 may also remove configurations provided in existing project data 132 from a "bootstrap.yml" file in the application files 112 at block 416, and/or add new configurations for a secrets manager of the cloud computing environment 106 in the "bootstrap.yml" file at block 418. As another example, the configuration tool 102 may add a new "application-sandbox.yml" configuration file to the application files 112, for instance to configure the software application to execute within a "sandbox" environment in the cloud computing environment 106 initially and/or for testing purposes. As another example, the configuration tool 102 may reset an application context path referenced in, or associated with, the application files 112, to a new application context path associate with the cloud computing environment 106 that corresponds with a gateway type selected by the user input 110, for instance via the gateway type option 312 shown in FIG. 3.

At block 420, the configuration tool 102 can update the application files 112 based on user input 110 received at block 402. As discussed above, if the software application is an existing application that is being migrated from a previous computing environment, the application files 112 can have originated as a cloned copy of existing project data 132, and have been modified at blocks 416 and 418 to remove configuration details associated with the previous computing environment and to add configuration details associated with the cloud computing environment 106. If the software application is a new application, the application files 112 can have originated as a cloned copy of stock project data 128. Such stock project data 128 may be pre-configured to include at least some default configuration details associated with the cloud computing environment 106.

Accordingly, at block 420, the configuration tool 102 can further modify the application files 112, such as modified copies of existing project data 132 or copies of stock project data 128, based on the user input 110. As an example, although stock project data 128 may be pre-configured to include at least some default configuration details associated with the cloud computing environment 106, if the user input 110 included selection of configuration options not reflected in default configuration details provided in the stock project data 128, such as a user selection of whether or not to use a secrets manager of the cloud computing environment 106 and/or a selection of a gateway type, the configuration tool 102 can modify the application files 112 to reflect the user-selected options as discussed above with respect to block 418.

As another example, at block 420 the configuration tool 102 can update the application files 112 by adding a new container file, such as a Dockerfile, and adding or updating a configuration of the new container file based on information provided within the user input 110. For instance, the configuration tool 102 can update a configuration associated with the added container file to reference a project name provided in the user input 110, for instance via the project name field, such that the project name can be used in executable commands associated with the container file.

As another example, the configuration tool 102 can update the application files 112 by adding an executable script file, such as a shell script file, and updating the script file based on details in the user input 110 and/or other modifications made to the application files 112. For example, the configuration tool 102 can create and/or update the executable script file to include secret values provided via the secrets fields 316, a URL to be associated with the software application within the cloud computing environment based on the project name provided via the project name field 306 or other information, environment variables for Terraform code or other infrastructure configuration data 114, and/or other information.

At block 422, the configuration tool 102 can update the cloned stock infrastructure configuration data 130 received at block 406, based on the user input 110 and/or the application files 112, to generate the infrastructure configuration data 114 to be included in the application package 104. For example, the configuration tool 102 can add a Terraform infrastructure configuration file, or other type of infrastructure configuration data 114, to the application package 104 based on the cloned stock infrastructure configuration data 130. The configuration tool 102 can also update the infrastructure configuration data 114 based on details provided in the user input 110, for instance to add infrastructure configuration details associated with a gateway type selected by a user via the gateway type option 312, to add a secrets manager configuration based on user input 110 provided via the secrets manager option 314 and/or the secrets fields 316, and/or to add other infrastructure configuration details based on the user input 110.

As another example, the stock infrastructure configuration data 130 may reference a default health endpoint that can be used to monitor the health of the software application when the software application executes in the cloud computing environment 106. However, if the software application is being migrated from a previous computing environment, an analysis of a POM file or other configuration details from existing project data 132 at block 414 may have identified a different health endpoint that is associated with the software application. Accordingly, at block 422, the configuration tool 102 can modify the infrastructure configuration data 114 to reference the identified health endpoint that is already associated with the software application, instead of the default health endpoint referenced in the stock infrastructure configuration data 130.

At block 424, the configuration tool 102 can generate the deployment instructions 116 to be included in the application package 104 along with the application files 112 and the infrastructure configuration data 114. The deployment instructions 116 can be dynamically generated at block 424 based on the user input 110 and/or operations to update the application files 112 and/or the infrastructure configuration data 114 discussed above. For example, the deployment instructions 116 can be generated to include user instructions, and/or example commands for a series of deployment steps that may include one or more of an instructions for performing and/or verifying deployment prerequisites, generating credentials associated with the cloud computing environment 106, initiating a Terraform or other "infrastructure as code" project, setting up and/or configuring infrastructure of the cloud computing environment 106, building an image of the software application and/or creating a container to run the image within the cloud computing environment 106, removing or destroying the infrastructure of the cloud computing environment 106 after execution of the software application, and/or other operations. The deployment instructions 116 may also indicate policy information, associated with an entity corresponding with the user device 108, regarding usage of the user device 108 in association with the cloud computing environment 106.

In some examples, the deployment instructions 116 may also include different or additional information if the software application is being migrated to the cloud computing environment 106 from a previous computing environment. For example, if the configuration tool 102 determined at block 408 that the software application is an existing application being migrated to the cloud computing environment 106, the deployment instructions 116 generated at block 424 can include instructions on how to check a transformation associated with the migration, how to update a health endpoint configuration associated with the migration, instructions on how to use a secrets manager of the cloud computing environment 106 based on version information indicated in the existing project data 128, and/or other information associated with the migration.

At block 426, the configuration tool 102 can transfer the application files 112, the infrastructure configuration data 114, and the deployment instructions 116 to the user device 108. For example, the configuration tool 102 can transfer the application files 112, the infrastructure configuration data 114, and the deployment instructions 116 into the application package 104 by compressing the application files 112, the infrastructure configuration data 114, and the deployment instructions 116 into a ZIP file or other package, and by transferring the application package 104 to the user device 108. In some examples, the configuration tool 102 can present or enable the download application package option 320 in the user interface 120 when the application package 104 is ready to be transferred to the user device 108, and the configuration tool 102 can transfer the application package 104 to the user device 108 in response to a user selection of the download application package option 320.

Overall, the configuration tool 102 can, in response to the user input 110 associated with the software application received at block 402, automatically generate the application files 112, the infrastructure configuration data 114, and the deployment instructions 116 associated with the application package 104. The application package 104 generated by the configuration tool 102 can accordingly be used to configure the cloud computing environment 106 to execute the software application and to deploy the software application to be executed in the cloud computing environment 106, as described herein.

Figure 5:
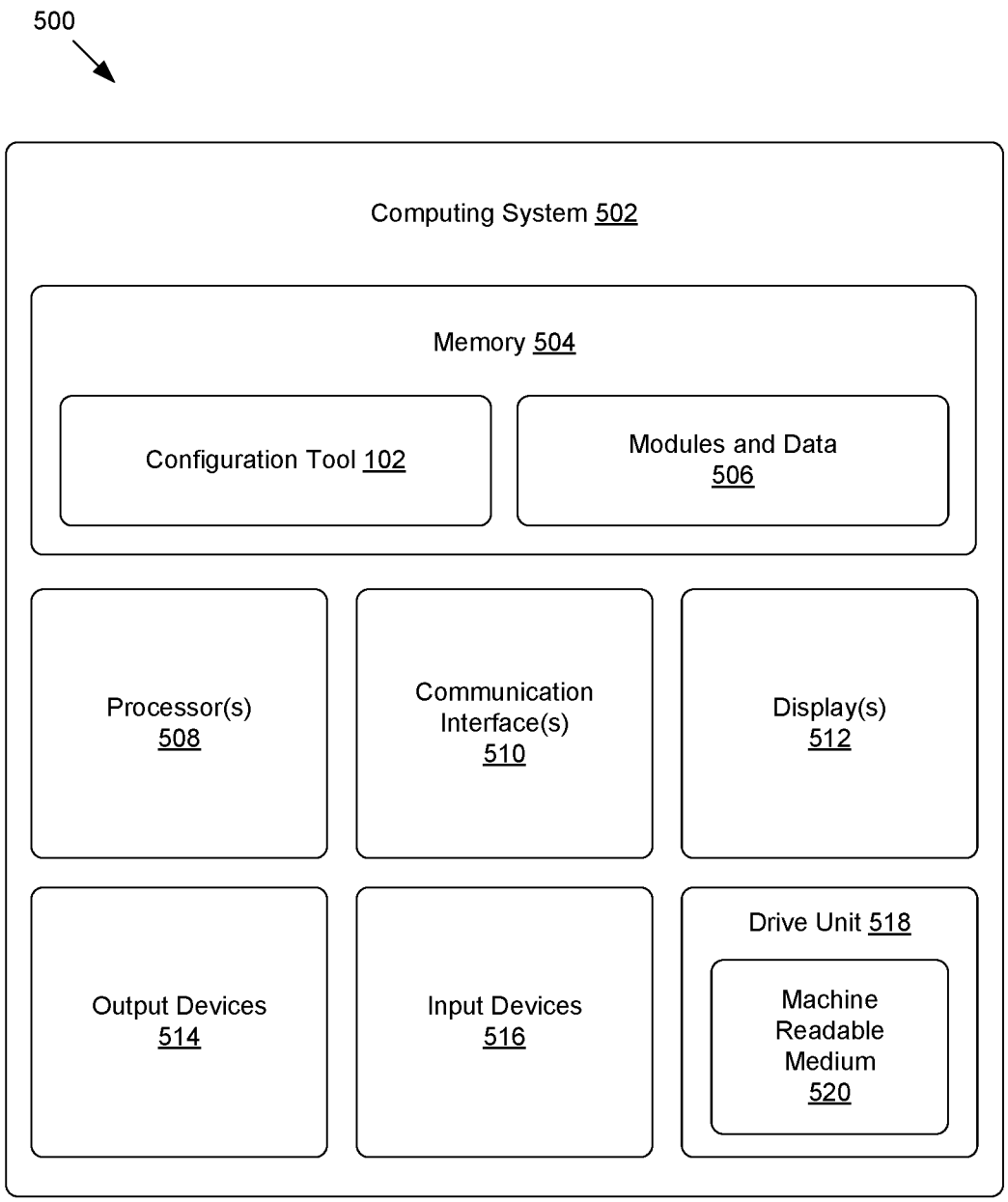
FIG. 5 shows an example system architecture for a computing system that can execute one or more elements of the configuration tool.

FIG. 5 shows an example system architecture 500 for a computing system 502 that can execute one or more elements of the configuration tool 102. The computing system 502 can include one or more computers, servers, or other types of computing devices. In some examples, the user device 108, template repository 124, the project repository 126, and/or other elements described herein can also be, and/or execute on, the computing system 502 or other computing systems that have the same or a similar system architecture.

In some examples, elements of the configuration tool 102 can be distributed among, and/or be executed by, multiple computing systems or devices similar to the computing system 502 shown in FIG. 5. As an example, the user interface 120 may be provided and/or executed by different computing devices and/or computing systems than computing devices and/or computing systems that execute the configuration generator 122. As discussed above, the computing system 502 may, in some examples, be the user device 108 or be part of the cloud computing environment 106 or other distributed system that hosts and/or executes one or more elements associated with the configuration tool 102.

The computing system 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 502. Any such non-transitory computer-readable media may be part of the computing system 502.

The memory 504 can store modules and data 506, including software or firmware elements, such as data and/or computer-readable instructions that are executable by one or more processors 508. For example, the memory 504 can store computer-executable instructions and data associated with the configuration tool 102. The modules and data 506 stored in the memory 504 can also include any other modules and/or data that can be utilized by the computing system 502 to perform or enable performing any action taken by the computing system 502. Such modules and data 506 can include a platform, operating system, and applications, and data utilized by the platform, operating system, and applications.

The computing system 502 can also have processor(s) 508, communication interfaces 510, a display 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with types of volatile (RAM) and/or nonvolatile (ROM) memory.

The communication interfaces 510 can include transceivers, modems, network interfaces, antennas, and/or other components that can transmit and/or receive data over networks or other connections. In some examples, the communication interfaces 510 can be used to exchange data between elements described herein, such as communications between the configuration tool 102 and the user device 108, the template repository 124, and/or the project repository 126.

The display 512 can be a liquid crystal display, or any other type of display commonly used in computing devices.

The output devices 514 can include any sort of output devices known in the art, such as the display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as a touch-sensitive display screen. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing system 502. The memory 504 and the processor(s) 508 also can constitute machine readable media 520.

Overall, the configuration tool 102 can receive user input 110 associated with a project to deploy a software application in the cloud computing environment 106, and can use the user input 110 to automatically generate the application package 104 for the software application. The application package 104 can include application files 112 configured to be executed within the cloud computing environment 106, infrastructure configuration data 114 that automatically configures elements of the cloud computing environment 106 for the software application, and customized deployment instructions 116 that describes steps and/or includes example commands for transferring and/or using the application files 112 and infrastructure configuration data 114 within the cloud computing environment 106. A user, who may not otherwise be familiar with aspects of the cloud computing environment 106 or have experience or skill with configuring aspects of the cloud computing environment 106, can use the application package 104 to configure the cloud computing environment 106 and deploy the software application in the cloud computing environment 106. For example, the user can follow steps described in, and/or use example commands provided in, the customized deployment instructions 116 to transfer the application files 112 and infrastructure configuration data 114 to the cloud computing environment 106, use the infrastructure configuration data 114 to automatically configure the cloud computing environment 106, and cause the cloud computing environment 106 to execute the software application based on the application files 112.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   receiving, by one or more processors, and from a user device via a user interface of a configuration tool, user input associated with a project to deploy a software application to a cloud computing environment;
   generating, by the one or more processors, application files associated with the project by modifying project data based on the user input;
   generating, by the one or more processors, infrastructure configuration data associated with the project based on the user input, wherein the infrastructure configuration data is configured to automatically configure one or more elements of the cloud computing environment in association with the software application;
   generating, by the one or more processors, deployment instructions indicating how to use the application files and the infrastructure configuration data within the cloud computing environment; and
   providing, by the one or more processors, the application files, the infrastructure configuration data, and the deployment instructions to the user device.

2. The computer-implemented method of claim 1, wherein:
   the software application is a new application,
   the user input indicates a selected programming language,
   the project data is stock project data for a starter application, executable within the cloud computing environment, written in the selected programming language.

3. The computer-implemented method of claim 2, wherein generating the application files comprises modifying one or more default attributes of the stock project data based on information provided within the user input.

4. The computer-implemented method of claim 2, further comprising:
   establishing, by the one or more processors, a session with a template repository based on authentication credentials provided in the user input; and
   retrieving, by the one or more processors, the stock project data from the template repository via the session.

5. The computer-implemented method of claim 1, wherein:
   the software application is an existing application being migrated from a second computing environment,
   the user input identifies a project repository that stores existing project data associated with the existing application, and
   the project data is a copy of the existing project data retrieved from the project repository.

6. The computer-implemented method of claim 5, wherein generating the application files comprises modifying the copy of the existing project data to at least one of:
   remove one or more first references to first elements of the second computing environment, or
   add one or more second references to second elements of the cloud computing environment.

7. The computer-implemented method of claim 1, wherein generating the infrastructure configuration data comprises:
   establishing, by the one or more processors, a session with a template repository based on authentication credentials provided in the user input;
   retrieving, by the one or more processors, a copy of stock infrastructure configuration data from the template repository via the session; and
   modifying one or more default attributes of the copy of stock infrastructure configuration based on at least one of:
   information provided within the user input, or
   modifications made to the project data to generate the application files.

8. The computer-implemented method of claim 1, wherein the deployment instructions are custom instructions, associated with the project, that are dynamically generated by the one or more processors based on at least one of:
the user input,
first modifications made to the application files based on the user input, or
second modifications made to the infrastructure configuration data.

9. The computer-implemented method of claim 1, wherein the deployment instructions describe a series of steps for:
transferring the application files and the infrastructure configuration data to the cloud computing environment;
executing the infrastructure configuration data to automatically configure the one or more elements of the cloud computing environment in association with the software application; and
causing the cloud computing environment to execute the software application based on the application files.

10. The computer-implemented method of claim 9, wherein:
the application files include a script configured to execute one or more steps of the series of steps; and
the deployment instructions comprise instructions to cause execution of the script.

11. The computer-implemented method of claim 9, wherein the deployment instructions comprise text of commands configured to cause execution of one or more steps of the series of steps.

12. The computer-implemented method of claim 1, wherein providing the application files, the infrastructure configuration data, and the deployment instructions to the user device comprises:
packaging, by the one or more processors, the application files, the infrastructure configuration data, and the deployment instructions into an application package; and
transferring, by the one or more processors, the application package to the user device.

13. A computing system, comprising:
one or more processors, and
memory storing computer-executable instructions associated with a configuration tool that, when executed by the one or more processors, cause the one or more processors to:
present, via a user device, a user interface of the configuration tool that requests user input associated with a project to deploy a software application to a cloud computing environment;
receive the user input via the user interface;
generate application files associated with the project by modifying project data based on the user input;
generate infrastructure configuration data associated with the project based on the user input, wherein the infrastructure configuration data is configured to automatically configure one or more elements of the cloud computing environment in association with the software application;
generate deployment instructions indicating how to use the application files and the infrastructure configuration data within the cloud computing environment; and
make the application files, the infrastructure configuration data, and the deployment instructions available for download to the user device.

14. The computing system of claim 13, wherein:
the software application is a new application,
the user input indicates a selected programming language,
the project data is stock project data for a starter application, executable within the cloud computing environment, written in the selected programming language.

15. The computing system of claim 13, wherein:
the software application is an existing application being migrated from a second computing environment,
the user input identifies a project repository that stores existing project data associated with the existing application,
the project data is a copy of the existing project data retrieved from the project repository, and
the one or more processors generate the application files by modifying the copy of the existing project data to at least one of:
remove one or more first references to first elements of the second computing environment, or
add one or more second references to second elements of the cloud computing environment.

16. The computing system of claim 13, wherein the deployment instructions describe a series of steps for:
transferring the application files and the infrastructure configuration data to the cloud computing environment;
executing the infrastructure configuration data to automatically configure the one or more elements of the cloud computing environment in association with the software application; and
causing the cloud computing environment to execute the software application based on the application files.

17. One or more non-transitory computer-readable media storing computer-executable instructions associated with a configuration tool that, when executed by one or more processors of a computing system, cause the computing system to:
present, via a user device, a user interface of the configuration tool that requests user input associated with a project to deploy a software application to a cloud computing environment;
receive the user input via the user interface;
generate application files associated with the project by modifying project data based on the user input;
generate infrastructure configuration data associated with the project based on the user input, wherein the infrastructure configuration data is configured to automatically configure one or more elements of the cloud computing environment in association with the software application;
generate deployment instructions indicating how to use the application files and the infrastructure configuration data within the cloud computing environment; and
make the application files, the infrastructure configuration data, and the deployment instructions available for download to the user device.

18. The one or more non-transitory computer-readable media of claim 17, wherein the deployment instructions describe a series of steps for:

transferring the application files and the infrastructure configuration data to the cloud computing environment;

executing the infrastructure configuration data to automatically configure the one or more elements of the cloud computing environment in association with the software application; and causing the cloud computing environment to execute the software application based on the application files.

19. The one or more non-transitory computer-readable media of claim 17, wherein the user interface requests that the user input indicate at least one of:

authentication credentials associated with at least one repository that stores at least one of the project data or a copy of stock infrastructure configuration data, a name of the project, an indication of whether the software application is a new application or an existing application being migrated to the cloud computing environment, or a selection of a programming language associated with the software application.

20. A configuration tool comprising:

means for receiving, via a user interface presented via a user device, user input associated with a project to deploy a software application to a cloud computing environment;

means for generating application files associated with the project by modifying project data based on the user input;

means for generating infrastructure configuration data associated with the project based on the user input, wherein the infrastructure configuration data is configured to automatically configure one or more elements of the cloud computing environment in association with the software application;

means for generating deployment instructions indicating how to use the application files and infrastructure configuration data within the cloud computing environment; and means for making the application files, the infrastructure configuration data, and the deployment instructions available for download to the user device.

* * * * *